Aug. 31, 1948.  L. I. YEOMANS  2,448,341
BEARING FOR ROTARY SHAFTS
Filed June 30, 1944
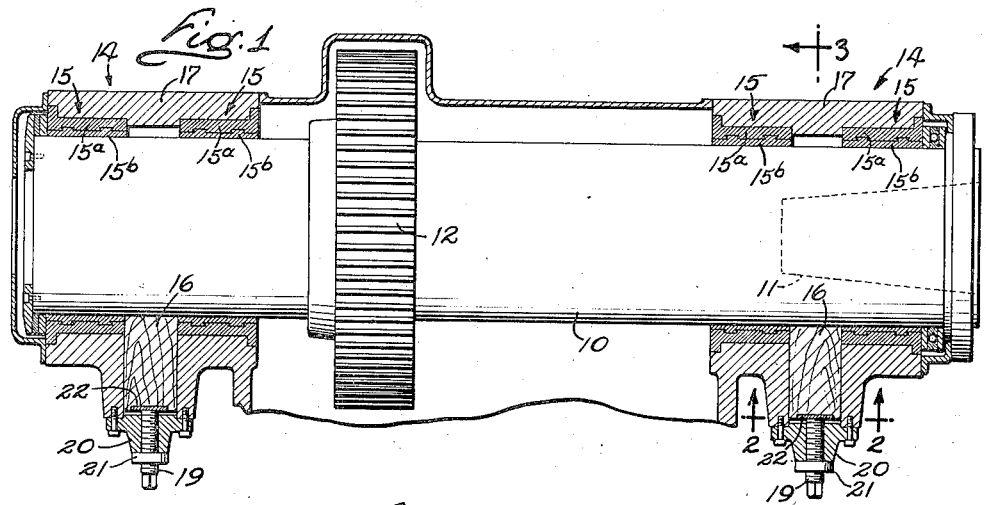
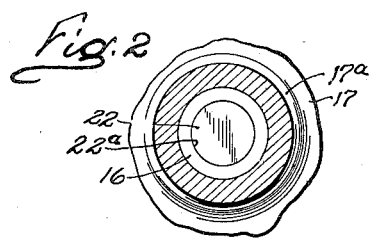
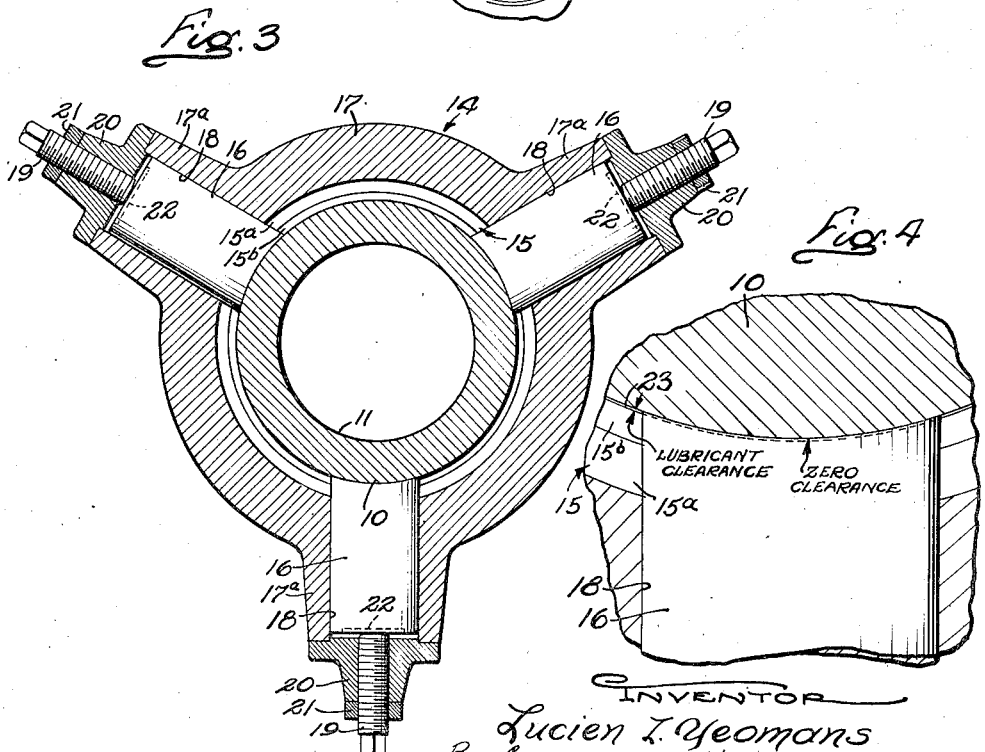
INVENTOR
Lucien I. Yeomans
By Carlson, Pitzner, Hubbard & Wolfe
ATTORNEYS Patented Aug. 31, 1948

2,448,341

UNITED STATES PATENT OFFICE 2,448,341

BEARING FOR ROTARY SHAFTS

Lucien I. Yeomans, Chicago, Ill., assignor to Lucien I. Yeomans, Inc., Chicago, Ill., a corporation of Illinois Application June 30, 1944, Serial No. 542,910

8 Claims. (Cl. 308—37)

The present invention pertains to bearings for rotary shafts.

The general aim of the present invention is to eliminate the vibration of shafts within their bearings normally incident to the use of shafts designed for heavy duty, or high speed, or both, as well as to eliminate the warm-up time normally required to conditioning machines for precision operation which incorporate such shafts.

Machine tools constitute one field in which the problem frequently occurs that the present invention aims to solve. For example, in heavy duty boring machines the boring shaft or spindle may be so large as to require a normal lubricant clearance of 0.0025 inch or, in other words, a bearing 0.005 inch larger than the shaft which it receives, yet lateral play of the shaft in any such amount would make real precision work quite out of the question. Even in lighter duty machines of high precision types, a long period of warm-up each morning is commonly required before suitably accurate work can be produced, for during the preceding idle period for the machine the horizontal shafts settle down in their bearings and squeeze out the oil film from beneath them. As a result it is necessary to run the machine quite a long while to reestablish completely the oil films in the bearings and thus effect relocation of the shafts on their true centers. The problem has become particularly acute in the design of high speed milling machines for exploiting the recently developed techniques for milling ferrous metals and alloys at many times the speeds heretofore thought possible. Such high speed milling, although offering great potentialities both as to speed and quality of production, makes imperative the use of cutter shafts or spindles of far greater strength (and therefore size) and speed than heretofore required, and yet the precision character of the operation demands an elimination of the play normally incident to large bearings. Moreover, the tendency to vibration is enhanced in no small degree by the inherent character of milling operations in general in which the cutter teeth engage the work in rapid succession. The present invention is especially suited to the solution of such problems.

More particularly stated, it is an object of the present invention to retain a rotary shaft accurately centered in a circumferential lubricant clearance in a bearing therefor, both during operating and idle periods, through the use of annular series of non-metallic shoes which are initially brought into tight peripheral contact with the shaft adjacent the bearing while the shaft is running truly on center with reference to the bearing, and setting up the shoes from time to time as they wear away so as to retain their contact with the shaft. In such case the actual bearing load is carried primarily by the bearing through its oil film, in the usual manner, and the shoes serve to retain the shaft centered with reference to such oil film.

Another object is to provide a novel bearing unit for a shaft incoporating not only a conventional bearing encircling the shaft with a suitable circumferential lubricant clearance and which is adapted to sustain the normal bearing load imposed by the shaft, but also an annular series of non-metallic shoes incorporated into the unit and located with reference to the bearing and shaft in such manner that once the shaft is running truly on center they can simply be forced into direct contact with the shaft periphery and set up from time to time as they wear away so that they not only prevent vibration of the shaft during normal operation, but also prevent settling of the shaft and consequent rupture of the oil film during idle periods.

Further objects and advantages of the invention will become apparent as the following description proceeds, taken in connection with the accompanying drawings in which:

Figure 1 is a side elevation of a boring machine spindle equipped with a pair of bearing units embodying the present invention, such units being shown in longitudinal section.

Figs. 2 and 3 are enlarged sectional views taken, respectively, substantially along the lines 2—2 and 3—3 in Fig. 1.

Fig. 4 is an enlarged fragmentary detail view taken substantially along the same section line as Fig. 3 and indicating the lubricant clearance space for the bearing as well as the zero clearance for direct contact of one of the shoes with the rotary shaft.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

Referring more particularly to the drawings, the invention has been exemplified herein as applied to the bearings for a shaft or spindle 10. The latter may, for example, be the spindle of a heavy duty boring machine, being socketed as indicated at 11 for the reception of a boring bar or the like and having a gear 12 fixed intermediate its ends by which it is driven from a suitable motor (not shown).

The opposite end portions of the shaft 10 are supported by two bearing units designated generally as 14 and each constructed in accordance with the present invention. Since these two units are substantially identical, a detailed description of one will suffice for both.

Each bearing unit 14 comprises as its essentials an ordinary bearing encircling the shaft with a circumferential lubricant clearance dimensioned in the conventional manner to its type, size and shaft speed, together with a closely adjacent and coacting annular series of shoes held in direct running contact with the shaft and serving to retain it accurately centered with reference to the bearing. The bearing referred to may be of any one of the several well-known types such, for example, as a sleeve bearing, either straight or tapered, a roller bearing or a ball bearing, all of these displaying in varying degrees a lateral play of the shaft which they carry and which the present invention is intended to eliminate. In the present instance the bearing has been shown as being of the straight or cylindrical sleeve type and as divided into two halves or sections 15 with an annular series of shoes 16 interposed between the two halves to bring such shoes into as close juxtaposition as possible with reference to the bearing proper.

Each of the bearing sections 15 comprises the usual metal sleeve 15a with a suitable lining 15b of low melting point bearing material. The sleeves 15 are fixed in cylindrical supporting housings 17, indicated in this instance as forming integral parts of a fragmentarily illustrated machine frame.

The shoes 16 must be of a material which will, upon direct running contact with the shaft 10, neither score the latter nor disintegrate so completely (as by melting) as to lose both their shape and rigidity. On the other hand, a fairly high rate of wear is not objectionable and, in fact, aids in conforming the active faces of the shoes to the exterior contour of the portion of the shaft which they contact. Moreover, the shoes should be of a material of low elasticity or low natural period of vibration to enhance their effect in absorbing and deadening vibration of the shaft. A non-metallic material, preferably a hard wood such as maple, may be employed to meet these requirements. In the present instance three such shoes or blocks 16 are used, that being substantially the minimum number that may be utilized to retain the shaft centered.

In the construction illustrated, each of the shoes 16 is fashioned in the form of a plug or block of round cross section. These shoes are slidable endwise within complementally shaped bores 18 extending through enlargements 17a on the housing 17 and spaced at intervals of 120 degrees circumferentially about the shaft. The inner ends of the shoes 16 are arcuate in contour and of a radius such that they conform precisely to the curvature of the shaft periphery.

To facilitate adjustment of the shoes 16 into direct running contact with the shaft 10, adjusting screws 19 are provided. These screws are threaded in caps 20 fixed to the housing enlargements 17a and are equipped with lock nuts 21. The inner ends of the screws 19 bear against disk-shaped plates 22 received in complementally shaped recesses 22a in the outer ends of the shoes 16.

The areas of the main bearing sections 15 are calculated in the usual manner to be sufficiently great to sustain substantially the entire bearing loads imposed by the shaft without aid from the shoes 16. The active end faces of such shoes, on the other hand, may be of substantially smaller area than that of the bearings when sleeve type bearings are used. Moreover, the bearing sections 15 are dimensioned to afford a lubricant clearance space 23 (Fig. 4) circumferentially about the shaft. Such clearance space is wide enough to accommodate an oil film of requisite thickness for the size and type of bearing employed. Lubricant may of course be supplied in any suitable well-known manner. The shoes 16, on the other hand, are forced directly into contact with the periphery of the shaft and have no clearance from it at all as indicated in Fig. 4 by the notation "zero clearance." Some of the lubricant which tends to flow along the shaft to these shoes will penetrate the same if they are of a porous material such as wood, as heretofore indicated, but in any event the zero clearance prohibits the formation of an actual oil film between their active faces and the shaft.

The function of the shoes 16 is to retain the shaft 10 accurately centered with reference to its bearings or, in other words, to maintain the clearance 23 uniform about the shaft periphery at all times. Lateral play of the shaft during operation is thus prohibited and gravity settling of the shaft during its idle periods, which would otherwise rupture the oil film beneath the shaft, is also prohibited. The non-resilient shoes, running in direct contact with the shaft, effectually absorb or deaden vibration of the latter.

One problem which presents itself is the initial adjustment of the shoes 16 into contact with the shaft in such manner that it will be held in position to rotate truly on center with reference to the bearings proper, as distinguished from holding it in some off-center position. For that purpose the shoes 16 are initially backed off slightly out of contact with the saft and the latter is rotated at moderate speed under little or no load for a substantial period of time. Such free rotation of the shaft is continued until the oil film has had an opportunity to build up uniformly around it. The procedure usually followed in warming up a machine may be employed. Thereafter the rotation of the shaft on center with reference to the bearings is continued and the shoes 16 are gradually advanced by the adjusting screws 19 until the shoes are all in direct running contact with the shaft. Once having been thus brought into contact with the shaft while it is revolving in accurately centered relation to the bearings, the shoes will thereafter maintain it so even through long periods of idleness or exacting conditions of operation.

In the course of use the faces of the shoes 16 wear away but the machine operator has only to advance them from time to time by the screws 19 to overcome the effects of wear. It will be appreciated that no nicety of adjustment is required in this periodic advancement of the shoes. All the operator has to do is to turn the adjusting screws until the wood shoes 16 begin to smoke.

I claim as my invention:

1. In a bearing unit for a rotary shaft, the combination of a bearing and an annular series of non-metallic shoes each adapted to encircle tthe shaft, housing means for supporting said bearing and series of shoes in closely juxtaposed side-by-side relation, and adjustment means for shifting said shoes individually inward toward said shaft into direct running contact with the latter while it is revolving on center with reference to said bearing and thereafter maintaining said shoes in contact with said shaft, to thereby retain a fixed circumferential clearance between said shaft and bearing.

2. In a bearing unit for a rotary shaft, the combination of a housing, a bearing mounted in said housing supportingly encircling said shaft and in which said shaft has a lateral play, a plurality of shoes disposed within said housing closely adjacent the bearing at circumferentially spaced points about said shaft and in direct contact with the latter, whereby said shaft is held accurately alined with reference to said bearing, and adjusting means carried by said housing for shifting said shoes individually inward toward said shaft and for rigidly retaining said shoes against displacement outwardly of said shaft away from their positions of adjustment.

3. The combination with a bearing having a fixed circumferential clearance about a rotary shaft which it encircles, of an annular series of shoes disposed closely adjacent said bearing and presenting arcuate faces conforming in contour to the exterior of the shaft and disposed in direct running contact therewith, together with means for rigidly holding said shoes against displacement outwardly of said shaft.

4. The combination with a bearing adapted to support a tool spindle with a limited lateral play for the latter, of auxiliary means for frictionally gripping the spindle in direct running contact with the latter to hold the same accurately alined with reference to said bearing, together with supporting means for rigidly holding said auxiliary means against displacement outwardly of said shaft.

5. In a bearing unit for a rotary shaft, the combination of a housing, a bearing mounted in said housing supportingly encircling said shaft and in which said shaft has a lateral play, said housing having an annular series of recesses therein spaced uniformly circumferentially about said shaft and opening inward toward the latter, each of said recesses having a non-metallic block slidably received therein, said blocks having arcuate inner end faces conforming to the curvature of the shaft periphery, and means including adjusting screws for forcing said blocks inward and retaining the same in direct running contact with said shaft.

6. In a bearing unit for a rotary shaft, the combination of a housing, a pair of sleeve bearing elements mounted within said housing in spaced relation to each other axially of the shaft and each dimensioned to encircle the shaft with a small clearance about the latter, an annular series of non-metallic shoes mounted in said housing between said bearing elements to encircle the shaft, and adjusting means for shifting said shoes individually inward toward the shaft center and for retaining such shoes in direct contact with the shaft.

7. In a bearing unit for a rotary shaft, the combination of a housing, a pair of sleeve bearing elements mounted within said housing in spaced relation to each other axially of the shaft and each dimensioned to encircle the shaft with a small clearance about the latter, an annular series of wooden blocks mounted in said housing between said bearing elements to encircle the shaft, and adjusting means for shifting said wooden blocks individually inward toward the shaft center and for retaining such wooden blocks in direct contact with the shaft.

8. The combination with a bearing adapted to receive a shaft with a small lateral play therefor, of an annular series of wooden blocks disposed closely adjacent said bearing and positioned to encircle a shaft carried by the bearing in direct running contact with such shaft at uniformly spaced points about the latter's periphery.

LUCIEN I. YEOMANS.

REFERENCES CITED

The following references are of record in the file of this patent:

UNITED STATES PATENTS

| Number | Name | Date |
| --- | --- | --- |
| 1,162,125 | Bassett | Nov. 30, 1915 |
| 1,697,046 | Chapman | Jan. 1, 1929 |
| 2,003,316 | Schein | June 4, 1935 |
| 2,010,965 | Schrivener | Aug. 13, 1935 |
| 2,309,397 | Illmer | Jan. 26, 1943 |

FOREIGN PATENTS

| Number | Country | Date |
| --- | --- | --- |
| 349,473 | Germany | Mar. 4, 1922 |